US011235875B2

(12) United States Patent
Sohmshetty et al.

(10) Patent No.: US 11,235,875 B2
(45) Date of Patent: Feb. 1, 2022

(54) ZONE-BASED UNMANNED AERIAL VEHICLE LANDING SYSTEMS AND METHODS

(71) Applicant: Ford Global Technologies, LLC, Dearborn, MI (US)

(72) Inventors: Raj Sohmshetty, Canton, MI (US); James Carthew, Oakland, CA (US); Erol Dogan Sumer, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 16/406,936

(22) Filed: May 8, 2019

(65) Prior Publication Data

US 2021/0086896 A1    Mar. 25, 2021

(51) Int. Cl.
*B64C 39/02* (2006.01)
*B64C 13/16* (2006.01)
*G05D 1/06* (2006.01)
*G08G 5/00* (2006.01)
*G08G 5/02* (2006.01)

(52) U.S. Cl.
CPC ............ *B64C 39/024* (2013.01); *B64C 13/16* (2013.01); *G05D 1/06* (2013.01); *G08G 5/0013* (2013.01); *G08G 5/02* (2013.01); *B64C 2201/141* (2013.01)

(58) Field of Classification Search
CPC combination set(s) only.
See application file for complete search history.

(56) References Cited

U.S. PATENT DOCUMENTS 9,964,951 B1* 5/2018 Dunn .................. G05D 1/0088
10,429,838 B2* 10/2019 Sterling ............... G05D 1/0027
2015/0339931 A1* 11/2015 Yu
(Continued)

FOREIGN PATENT DOCUMENTS

WO    2016/210432 A1    12/2016
WO    2018/064657 A1    4/2018

OTHER PUBLICATIONS

Takahashi, et al., "Evaluation of Safe Landing Area Determination Algorithms for Autonomous Rotorcraft Using Site Benchmarking," American Helicopter Society 67th Annual Forum, Virginia Beach, VA, May 3-5, 2011 (23 pages).
(Continued)

*Primary Examiner* — Thomas G Black
*Assistant Examiner* — Anthony M Gartrelle
(74) *Attorney, Agent, or Firm* — Brandon Hicks; Eversheds Sutherland (US) LLP

(57) ABSTRACT

Zone-based unmanned aerial vehicle landing systems and methods are provided herein. An example method includes establishing a plurality of operational zones, each of the plurality of operational zones being associated with a range of altitudes, guiding an unmanned aerial vehicle (UAV) through each of a plurality of operational zones to land the UAV on a target location using sensors, wherein the sensors are configured to sense a distance between the UAV to the target location, further wherein portions of the sensors are configured for use at different altitudes, and determining an error for the UAV during landing, wherein the UAV retreats to a higher altitude operational zone when the error is determined.

18 Claims, 5 Drawing Sheets

(56) References Cited

U.S. PATENT DOCUMENTS

2016/0257424 A1      9/2016  Stabler et al.
2016/0364989 A1*    12/2016  Speasl .................. G08G 5/0034
2017/0045894 A1      2/2017  Canoy et al.
2017/0301220 A1    10/2017  Jarrell et al.
2018/0364740 A1    12/2018  Collins et al.

OTHER PUBLICATIONS

FlytDock Drone-Agnostic Precision Landing Solution. (Dec. 10, 2018). pp. 1-9. Retrieved from https://www.uasvision.com/2018/12/10/flytdock-drone-agnostic-precision-landing-solution/.

* cited by examiner

ZONE-BASED UNMANNED AERIAL VEHICLE LANDING SYSTEMS AND METHODS

TECHNICAL FIELD

The present disclosure relates to unmanned aerial vehicle (UAV) systems and methods that allow for accurate and fail-safe landing of UAVs using configurable operational zones having unique altitude ranges and sensor parameters, as well as error correction.

BACKGROUND

In general, UAVs are configured with hovering capabilities but suffer from poor precision during landing. Some issues contributing to these problems include, but are not limited to, lack of accuracy in some sensors used on UAVs, such as global positioning system (GPS) sensors, which lack granularity in accuracy as they are only accurate to approximately +/−three feet. UAV control systems provide predetermined control logic which is not adequate for noisy or dynamic landing conditions. Due to the need to maximize range (between long battery recharging times), UAVs are optimized for efficiency and not for control and precision (e.g., quadcopters, hexacopters; two-blade rotors instead of four-blade rotors). External factors may also lead to errant UAV landing such as downdraft created by UAV propellers, which can be reflected from the target location and may affect UAV stability. In some instances, high winds or wind gusts may cause the UAV to be off balance at the time of touch down. These challenges are compounded further if the target location is on a moving base, such as a vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to provide fail-safe landing of UAVs on target locations, and in some embodiments target locations that are mobile. In some embodiments, the systems and methods are fail-safe and intended to prevent damage to a vehicle, bystanders, or other proximate objects.

In more detail, the systems and methods herein are configured to provide a means for UAVs and/or target locations to implement an altitude-based or zoned approach for landing UAVs on target locations. In some embodiments, a reach, retreat, and retry process is implemented that includes the establishment of a plurality of operational zones. In various embodiments, methods such as proportional navigation can be used to detect and remedy errors detected during UAV landing, such as misalignment between the UAV and a subordinate target location such as a landing platform.

In some instances, the plurality of operational zones can each comprise a configured geo-fence boundary having a height and a width (e.g., diameter) that define a column or cylinder of airspace. The UAV can land by sequentially passing through each of these operational zones. In some embodiments, the UAV and/or target location can use specific types of sensors that are appropriate for a range of altitudes assigned to each of the operational zones. In general, a sensor used herein is capable of allowing the UAV, target location, or both to determine a location and/or orientation (orientation being indicative of an alignment between the UAV and target location) of the UAV relative to the target location.

During transit, the UAV, target location or a combination of both can determine if the UAV has experienced an error condition or exception based on sensor input. When an error condition is determined when the UAV is in a current operational zone, the UAV can be controlled back to and outer zone (e.g., a higher-altitude operational zone). The UAV can again attempt to pass through the operational zone. Error conditions can be triggered based on a variety of conditions such as excessive UAV movement. This process ensures that the UAV lands on the target location when the UAV has passed through each of the operational zones without triggering an error condition or exception. These and other advantages of the present disclosure are provided in greater detail herein.

Illustrative Embodiments

Figure 1:
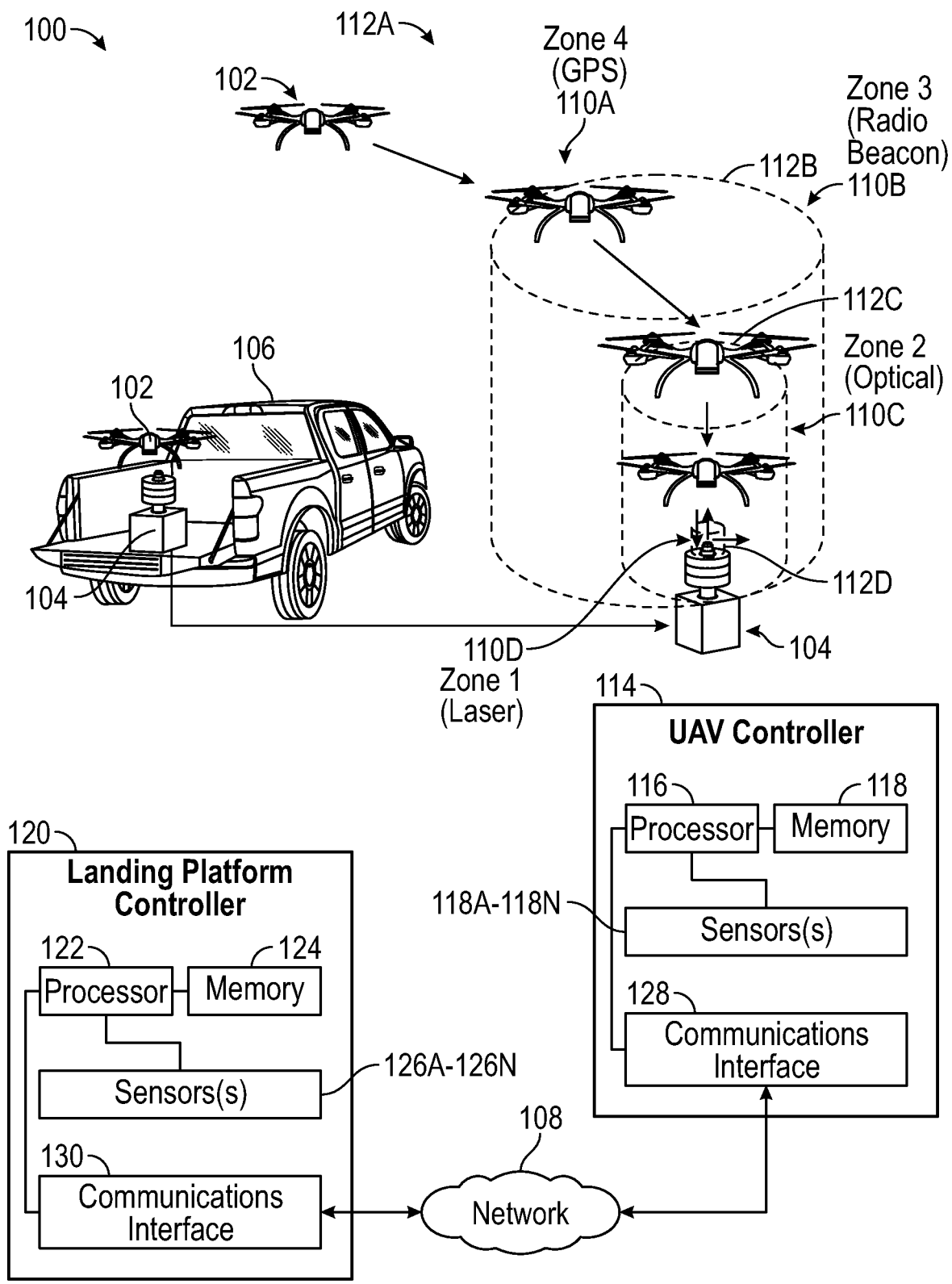
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a UAV 102, a target location 104, a vehicle 106 and a network 108. The network 108 may include any one or a combination of multiple different types of networks, such as cable networks, the Internet, wireless networks, and other private and/or public networks. In some instances, the network 108 may include cellular, Wi-Fi, or Wi-Fi direct. In some embodiments, some functionalities disclosed herein can be executed entirely at the UAV level. In other embodiments, some functionalities disclosed herein can be executed entirely at the target location. In other embodiments, some functionalities disclosed herein can be executed cooperatively at the UAV and the target location together.

Figure 2A:
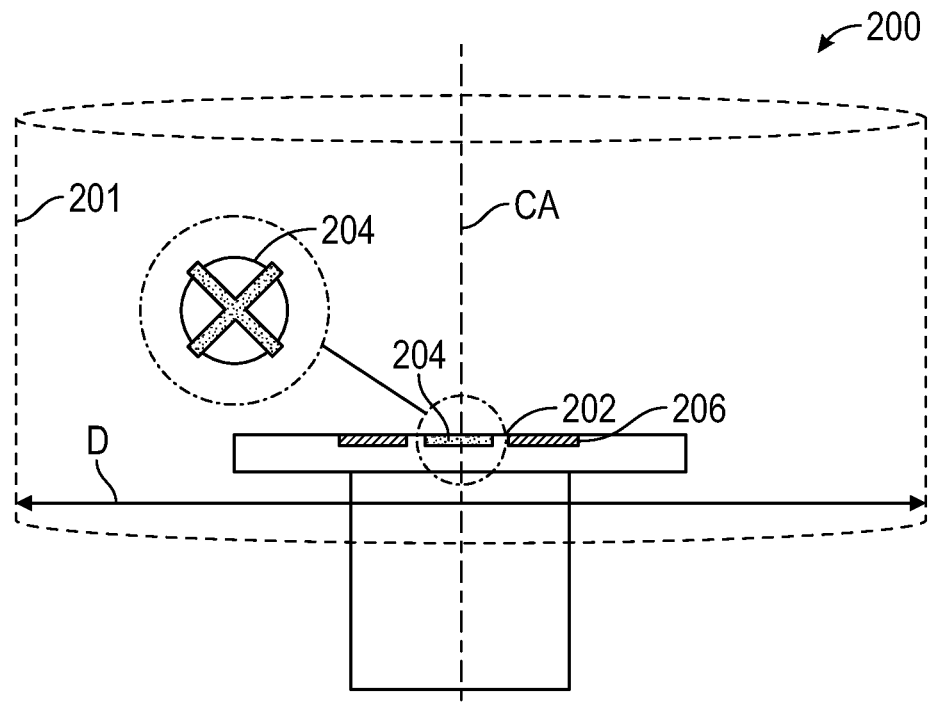
FIG. 2A is an elevation view of an example target location having a landing surface, in combination with a geo-fence.

In various embodiments, the target location 104 can be disposed on the vehicle 106. The target location 104 can also be a stationary device. The UAV 102 may be controlled to land on the target location 104 by passing through a plurality of operating zones such as first operational zone 110A (also referred to as a highest altitude operational zone), a second operational zone 110B (also referred to as a first intermediate altitude operational zone), a third operational zone 110C (also referred to as a second intermediate altitude operational zone), and a fourth operational zone 110D (also referred to as a lowest altitude operational zone or penultimate zone). According to some embodiments, the various operational zones can be established by the UAV, the target location, or combinations thereof. In general, the operational zones can be defined by geo-fences. In this example, a portion of the operational zones has a geo-fence that can be shaped as a cylinder or column that has a height dimension and a diameter dimension. An operational zone can comprise a range of altitudes defined by the height dimension and a horizontal distance from a central axis of the target location 104. An example central axis of a target location is illustrated in FIG. 2A.

In one embodiment, the first operational zone 110A is any location or position that is outside a range of altitudes of the second operational zone 110B. Effectively, the first operational zone 110A is a free zone space 112A. The second operational zone 110B is defined by a geo-fence 112B. The third operational zone 110C is defined by a geo-fence 112C and the fourth operational zone 110D is defined by a geo-fence 112D. In some embodiments, the UAV 102 passes sequentially through each of the operational zones 110A-110D until it successfully lands on the target location 104. In one embodiment, the first operational zone 110A includes any location where the UAV 102 is at or above one thousand feet above the target location 104, regardless of its orientation/alignment to the target location 104. The second operational zone 110B includes the geo-fence 112B defined by any location where the UAV 102 is at or above five hundred feet above the target location 104 and within a 100-foot diameter of the central axis of the target location 104 (see FIG. 2A for an illustration of a central axis.

The third operational zone 110C includes the geo-fence 112C defined by any location where the UAV 102 is at or above fifty feet above the target location 104 and within a ten-foot diameter of the central axis of the target location 104. The fourth operational zone 110D includes the geo-fence 112D defined by any location where the UAV 102 is at or above five feet above the target location 104 and within a one-foot diameter of the central axis of the target location 104. To be sure, while four specific operational zones and corresponding geo-fences have been disclosed, fewer or additional operational zones can be utilized in accordance with the present disclosure.

In some embodiments, the UAV 102 comprises a UAV controller 114 that comprises a processor 116 and memory 118. The memory 118 stores instructions that are executed by the processor 116 to perform aspects of the UAV landing procedures disclosed herein. When referring to operations executed by the UAV controller 114 it will be understood that this includes the execution of instructions by the processor 116. According to some embodiments, the UAV 102 comprises a plurality of sensors 118A-118N such as radio, inertial measurement unit (IMU), sonar, light detection and ranging (LIDAR), and/or a camera. Collectively, the plurality of sensors 118A-118N are configured to provide any one or more of GPS signals, real-time kinematic GPS signals, dead reckoning signals, barometer signals, sonar signals, ultrasound signals, light detection and ranging (LIDAR) signals, and camera images. In some embodiments, one or more of these sensor types are selected for use based on a current altitude of the UAV or a current operational zone in which the UAV is operating. Details on operational zones are provided in greater detail herein. In some embodiments, the UAV 102 includes all, or a portion of the plurality of sensors 118A-118N.

In one embodiment, the UAV controller 114 utilizes one or more of the plurality of sensors 118A-118N at each of the operational zones disclosed above. For example, when the UAV 102 is within the first operational zone 110A, the UAV controller 114 may utilize any one or more of a GPS sensor, a real-time kinematic sensor, a dead reckoning sensor, a barometer, or combinations thereof to determine a position of the UAV 102 relative to the target location 104.

When the UAV is within the second operational zone 110B, the UAV controller 114 may utilize any one or more of sonar, ultrasound, and/or LIDAR to determine a position of the UAV 102 relative to the target location 104. When the UAV is within the third operational zone 110C, the UAV controller 114 may utilize any one or more of LIDAR and camera images to determine a position of the UAV 102 relative to the target location 104. When the UAV is within the fourth operational zone 110D, the UAV controller 114 may utilize any camera images to determine a position of the UAV 102 relative to the target location 104. In some embodiments, the target location 104 includes a fiduciary object such as a two or three dimensional image that the UAV controller 114 can read and use to align itself with the target location 104. This alignment is a fine-tuning alignment of the UAV 102 position when it is very near contact with the target location 104. Again, the exact dimensions of each operational zone are selectable and can vary according to design requirements.

In some embodiments, a location or position of the UAV 102 relative to the target location 104 can be determined from any of these inputs or sensor signals. In various embodiments, the UAV controller 114 can be configured to determine which of a plurality of operational zones the UAV is operating within. For example, the UAV controller 114 can be configured to determine a location of the target location 104 and determine a position of the UAV 102 relative to the target location 104. The current operational zone can be determined based on the relative position of the UAV 102 to the target location 104 as determined by the UAV controller 114. In some embodiments the UAV controller 114 stores parameters of the plurality of operational zones, such as the altitude ranges of the operational zones.

In certain embodiments, the UAV controller 114 receives the parameters of each operational zone from a target location controller (discussed in greater detail herein). The parameters can include altitude ranges, sensor types, and geo-fence boundaries. In other embodiments, the UAV controller 114 can be provided with a current location of the target location 104 and implements the operational zones using their specified parameters stored in memory 118 of the UAV 102. In some embodiments the UAV controller 114 receives a location of the target location 104 on a real-time or near-real-time basis, which is advantageous when the target location 104 is moving.

In some embodiments, the UAV controller 114 can select one or more of the plurality of sensors 118A-118N based on a current operational zone in which the UAV 102 is operating. That is, the UAV controller 114 may determine which operational zone it is currently operating within and select sensors that are appropriate for the operational zone. In one embodiment, the sensors used for operating the UAV 102 in the first operational zone 110A are capable of sensing a location at a less granular level than those used for sensing a location/orientation of the UAV 102 relative to the target location 104 at lower altitudes. That is, when flying at high altitudes in the first operational zone 110A the UAV 102 is not likely to encounter ground-based obstacles. To be sure, outer zones require less precision such that GPS alone is adequate if the UAV 102 operates at a high enough altitude to avoid obstacles.

When the flying at medium altitudes in the second operational zone 110B the UAV controller 114 may utilize environmental sensors (such as sonar, ultrasound, LIDAR, etc.) to avoid static obstacles such as transmission towers and buildings. When the flying at low altitudes in the third operational zone 110C the UAV controller 114 may utilize environmental sensors and predictive algorithms to navigate dynamic objects such as animals, humans, vehicles, and so forth. In general, intermediate zones accumulate sensor assets. As the UAV 102 reduces altitude, the surrounding environment becomes more cluttered. Static, and then dynamic obstacle avoidance is enabled as altitude decreases.

When flying at ultra-low altitudes in the fourth operational zone 110D the UAV controller 114 may utilize camera input to align the UAV 102 with the target location 104. At ultra-low levels (several feet to inches), the camera input allows for fine tune adjustments to both vertical and horizontal UAV 102 position relative to the target location 104 for final approach.

When in a penultimate zone (final zone prior to contact between the UAV 102 and the target location 104), which in this instance is the fourth operational zone 110D, the UAV controller 114 can ensure the UAV 102 is positioned directly above the target location 104. The final approach can be assisted by some form of communication between the UAV controller 102 and the target location 104. In one example embodiment, a fiducial marker is displayed on the target location 104. This fiducial marker can be tracked by a UAV mounted camera. Any suitable fiducial marker can be used such as any indicia including a symbol, a pattern, or other similar markings. In another embodiment, trajectory control and correction messages can be sent from the target location 104 to the UAV 102 (making use of off-board or non-UAV processing capabilities of target location 104). Thus, a controller of the target location 104 and the UAV controller 114 communicate with one another to guide the UAV 102 onto the target location 104 when the UAV 102 is in the lowest altitude operational zone.

According to some embodiments, the target location comprises a target location controller 120 that comprises a processor 122 and memory 124. The memory 124 stores instructions that are executed by the processor 122 to perform aspects of the UAV landing procedures disclosed herein. When referring to operations executed by the target location controller 120 it will be understood that this includes the execution of instructions by the processor 122. In various embodiments, the target location 104 can comprise any of the sensor types disclosed above such as GPS, real-time kinematic GPS, dead reckoning, barometer, sonar, ultrasound, light detection and ranging, and/or camera. Thus, the target location 104 comprises a plurality of sensors 126A-126N. In general, the sensor types selected for a given geo-fence and operational zone can be based on the range of altitudes encompassed by the geo-fence. Again, the higher the altitude, the less specific or sensitive the sensor type needs to be In some embodiments, the target location controller 120 can be configured to establish the plurality of operating zones as disclosed above. This can include selecting a size and shape of each of the geo-fences for one or more of the operating zones. Also, the target location controller 120 can select which of the aforementioned sensors should be utilized by the UAV 102 and/or the target location controller 120 for each of the plurality of operating zones. The target location controller 120 can communicate data regarding the operating zones (e.g., geo-fence parameters) and the sensor type(s) for each operating zone to the UAV 102.

In one embodiment, the target location comprises a global positioning sensor for a first operational zone of the plurality of operational zones, a radio beacon for a second operational zone of the plurality of operational zones, an optical sensor for a third operational zone of the plurality of operational zones, and a laser sensor for a fourth operational zone of the plurality of operational zones. The same arrangement per operational zone can be provided at the UAV level.

Figure 2B:
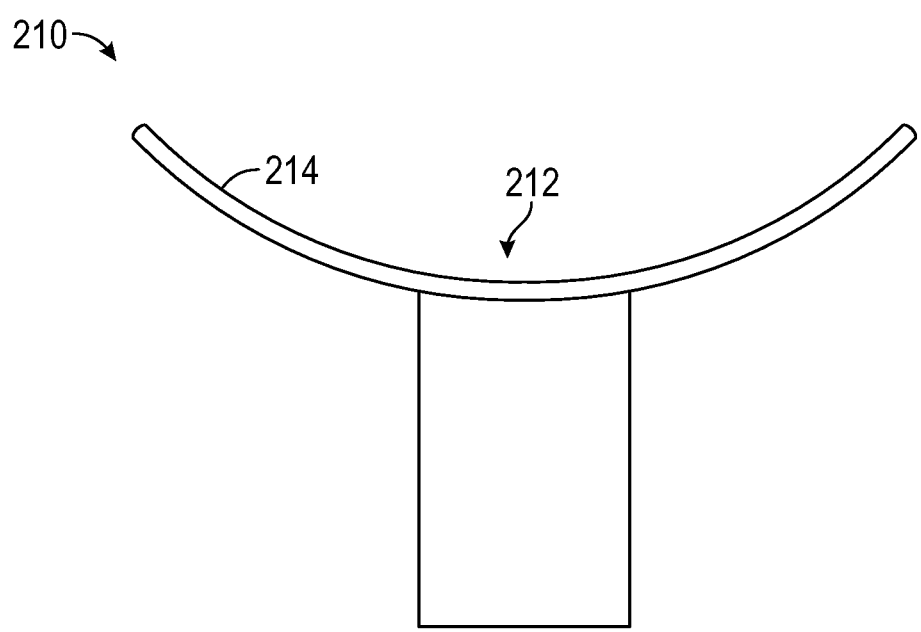
FIG. 2B is an elevation view of an example target location having a landing surface that is angled or concave.
Figure 2C:
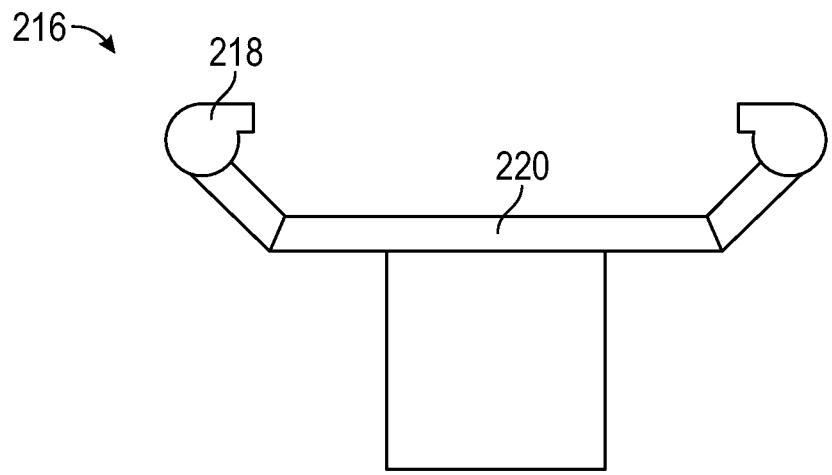
FIG. 2C is an elevation view of an example target location having a landing surface that is provided with fans or nozzles for guiding a UAV into position.

FIGS. 2A-2C each illustrates an embodiment of target locations that can be used as the target location 104 of FIG. 1. In FIG. 2A, a target location 200 includes a landing surface 202 that comprises a fiducial marker 204, which in this instance includes a symbol (such as an X within a circle) that can be viewed by a camera of a UAV, or other similar optical sensor. In this example, the fiducial marker 204 is aligned with a center of the landing surface 202. The fiducial marker 204 can be viewed by a camera on the UAV, which may be one of a plurality of devices/sensors available to the UAV.

A central axis CA is used as a reference to determine a lateral distance or diameter of a geo-fence established for the operational zones, such as geo-fence portion 201 which has a width that is defined by a radius or diameter D measured from the reference of the central axis CA. In some embodiments, the target location 200 comprises a landing assistance mechanism. In various embodiments, the landing assistance mechanism includes one or more magnets 206 that are adapted to attract to metallic components and/or magnets associated with a UAV. The one or more magnets 206 can be positioned on or within the landing surface 202. When a UAV is in a penultimate or lowest operational zone above the landing surface 202, the one or more magnets 206 exert magnetic forces on the UAV to draw the UAV down into contact with the landing surface 202. The one or more magnets 206 can be passive or active electromagnets.

FIG. 2B illustrates another example target location 210 that comprises a landing assistance mechanism which includes a landing surface 212 having a sidewall 214 that is angled or concave to guide a UAV into a center of the target location 210. The angled or concave sidewall 214 can be combined with magnets or fans/nozzles in some instances. The sidewall 214 can be provided with any desired shape or angle that assists a UAV in landing on the landing surface 212.

FIG. 2C illustrates another example target location 216 that comprises a landing assistance mechanism which includes at least one of duct fans or air nozzles 218 that direct a UAV into contact with a landing surface 220. In some embodiments, the air nozzles 218 can center a UAV above the landing surface 220 to prevent lateral movement of the UAV.

Referring back to FIG. 1, after the target location controller 120 has established the plurality of operational zones and coordinated with the UAV 102, the target location controller 120 determines which of a plurality of operational zones the UAV is operating within. This can be accomplished at higher altitude operational zones by communication between the UAV controller 114 and the target location controller 120. This could include communication over the network 108 when the UAV controller 114 and the target location controller 120 are far away from one another. Communication can occur over short range communications when the UAV controller 114 and the target location controller 120 are proximate to one another (e.g., within range to use a specific or selected short range wireless connection). In some embodiments, the UAV controller 114 utilizes a communications interface 128 and the target location controller 120 utilizes a communications interface 130. Each of the communications interface 128 and the communications interface 130 are capable of connecting to the network 108 or one another over a short range connection.

In operation, the UAV 102 passes through the plurality of operational zones in a sequential manner from a highest altitude entry zone to a lowest altitude entry zone to land on the target location 104. This process can be performed entirely by the UAV controller 114, entirely by the target location controller 120, or cooperatively between the UAV controller 114 and the target location controller 120.

During this landing process, the UAV controller 114 and/or the target location controller 120 are configured to monitor for error conditions with respect to the UAV 102. In general, when an error has occurred when the UAV is passing through one of the plurality of operational zones, a retreat and retry process can be performed by the UAV 102. Discovery of the error condition can occur by the UAV controller 114, the target location controller 120, or cooperatively therebetween.

In general, in response to an error, the UAV 102 can retreat from a current one of the plurality of operational zones to a higher-altitude one of the plurality of operational zones and attempt to pass through the current one of the plurality of operational zones again. This process reduces a likelihood that the UAV 102 may cause damage to itself or another object during landing. In broad terms, the retreat and retry processes ensure that the UAV 102 is not moving erratically or excessively within any given operational zone. For example, the UAV 102 may move excessively within an operational zone due to an unexpected wind gust. In another example, the UAV 102 may move excessively within an operational zone due to unexpected movement of the target location 104. In another example, the UAV 102 may move erratically within an operational zone due to environmental conditions or due to a mechanical, electrical, or communications related failure at the UAV or target location level.

These error conditions can be determined using any one or more processes such as the implementation of movement thresholds or use of techniques such as proportional navigation. With respect to movement thresholds, these can be maintained at the UAV or target location level. In general, if the UAV controller 114 and/or the target location controller 120 determine that the UAV 102 is operating within a geo-fence of an operational zone, it can be determined that the UAV 102 is not in an error condition. If the UAV controller 114 and/or the target location controller 120 determine that the UAV 102 was at one time inside a geo-fence of an operational zone but has moved outside of that geo-fence (but not into a lower geo-fence of an operational zone), an error condition can be triggered. Thus, the threshold is the boundaries of the geo-fence. In yet another example, if the UAV controller 114 and/or the target location controller 120 determine that the UAV 102 has moved in position erratically or excessively in a horizontal and/or vertical direction as compared with a movement threshold, an error condition may have occurred. For example, if the UAV 102 moves horizontally at a rate that is above five feet per second relative to the target location 104, it can be inferred that an error condition has occurred due to wind shear on the UAV 102. Again, these are merely examples, but overall the goal of determining error conditions is to ensure that the UAV 102 is in a controlled descent towards the target location 104 as it progresses through the operational zones. In some embodiments, unique error conditions can be applied for each of the operational zones. Thus, what triggers an error condition in one operational zone may not trigger an error condition in another operational zone. For example, movement thresholds established for a lower operational zone may not apply equally to a higher operational zone, which may have more lax movement thresholds or error determination conditions.

Figure 3:
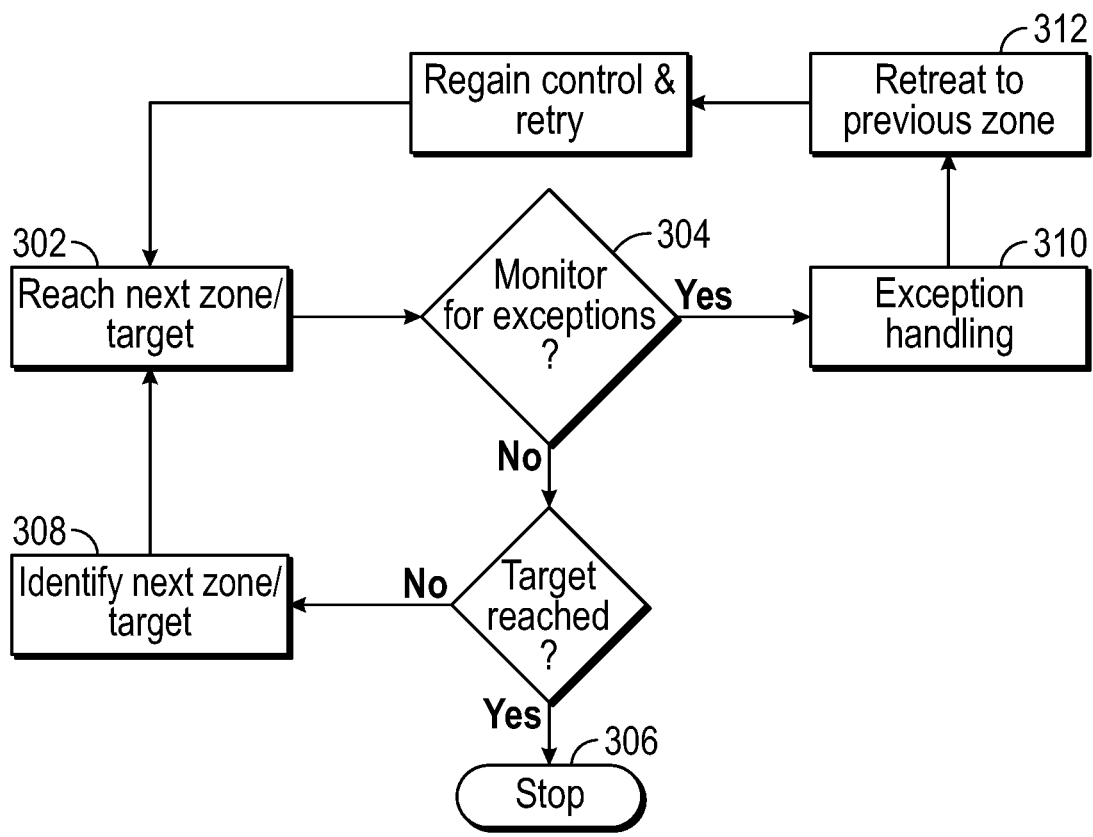
FIG. 3 is a flow diagram of an example retreat and retry (fail-safe) method used to remedy error conditions sensed during UAV landing.

Referring now to FIG. 3, an example method related to a reach, retreat, and retry process is illustrated. In general, the UAV is attempting to reach a next zone or target (such as the target location surface) in step 302. During this process, the UAV controller or target location controller can monitor for exceptions (e.g., error conditions) in step 304. If the UAV reaches its targeting during monitoring the monitoring process, cess terminates at landing in step 306. If no exception is encountered but the UAV has not reached its target, the method includes a step 308 of allowing the UAV to pass to another lower operational zone.

If an exception (e.g., error condition) is detected in step 304, the method transitions to a step 310 of exception handling. In some embodiments, exception handling can include causing the UAV to retreat to/from a current operational zone (the operational zone in which the error was detected) to a higher operational zone. In some instances, this can include an immediately higher operational zone. In other instances this can include causing the UAV to retreat to a highest operational zone. The UAV is allowed to regain control in step 312, which could include stabilizing or hovering in position or leveling of the UAV. Once control is regained, the UAV can retry entry and passage through the operational zones towards the target.

Figure 4:
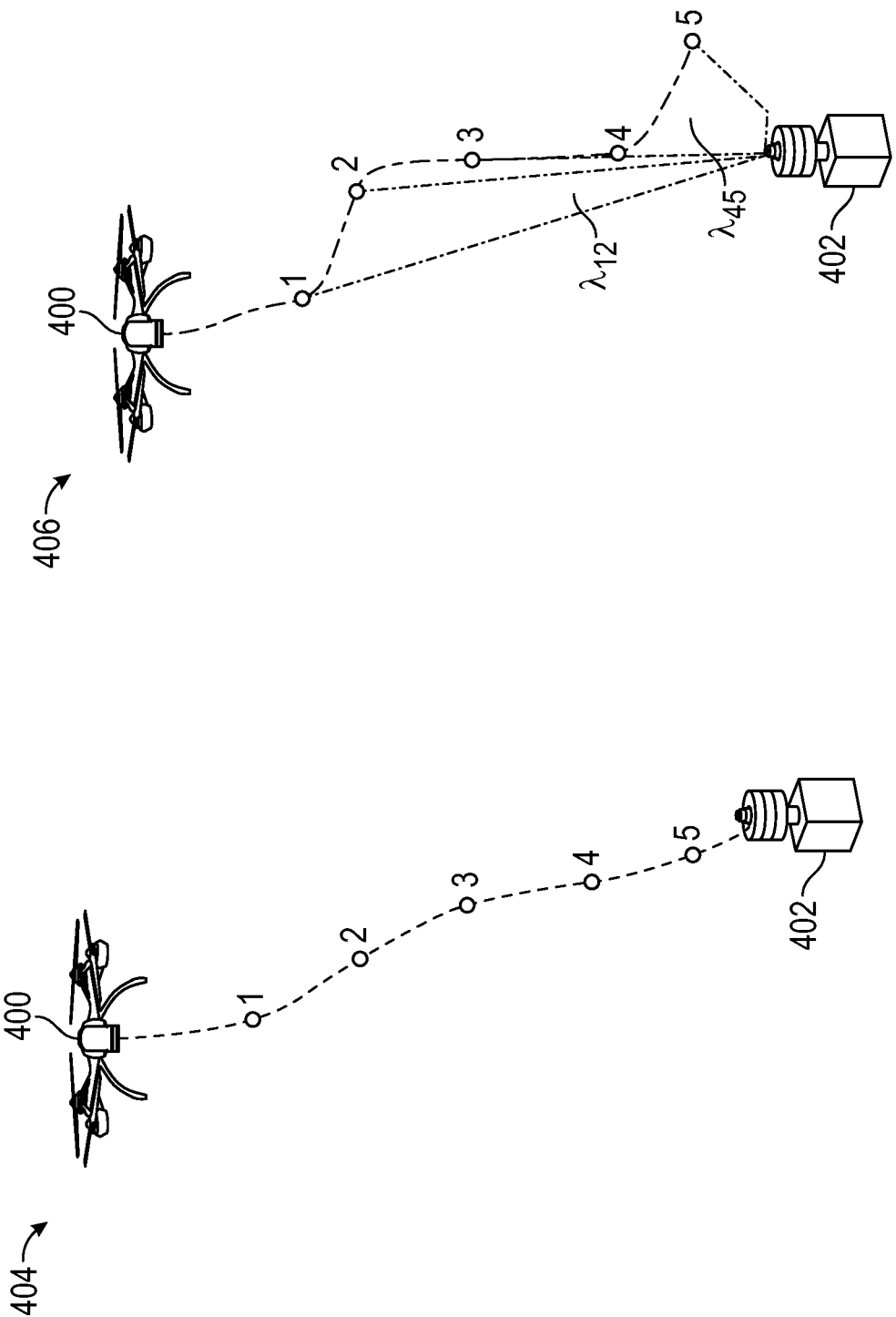
FIG. 4 illustrates example trajectories and methods of proportional navigation used for detecting and remedying error conditions during UAV landing.

FIG. 4 illustrates an example process for error detection using proportional navigation. In general, proportional navigation (PN) is a homing-guidance law. PN is based on a condition that if a line-of-sight (LOS) vector between a first vehicle and a target vehicle does not rotate as the first vehicle closes on the target vehicle, then the two vehicles are on a collision course. PN allows for calculation of lateral acceleration guidance for the first vehicle in order to maintain the direction of the LOS vector so that the target is intercepted, as shown to the right. The principles of PN guidance provide a zone-based retreat-retry exception monitoring for UAV precision landing. The rotational speed of the LOS between a UAV 400 and a target location 402 can be calculated in regular time intervals based on inertial positions and velocities of the UAV 400 and the target location 402. These signals are measured using different sensor configurations in each operational zone as outlined above.

The target location 402 may be a landing pad itself, possibly with some vertical approach threshold, or it could be a fixed-point on the boundary of a subsequent (e.g., higher altitude) zone.

If a rotational speed of the LOS goes outside a pre-set threshold due to an external disturbance, such as a wind gust, ground effect relative to the UAV 400, or a sudden acceleration of the target location 402, then an exception is triggered, and the UAV 400 retreats to an outer zone and retries the maneuver. Exception monitoring can be performed at the UAV level, the target location level, or cooperatively therebetween. This pre-set threshold can be chosen as a constant, or a function of the distance between the UAV 400 and the target location 402. Since the LOS rotation goes to infinity as the distance between the drone and the target approaches zero, the pre-set threshold can be made infinity when the UAV 400 is sufficiently close to the target location 402.

It will be understood that the rotational velocity of the LOS is inversely proportional to a distance between the UAV 400 and the target location 402. Therefore, small deviations in the UAV trajectory due to external disturbances may not trigger an exception when the UAV is far from the target location. Conversely, when the UAV is near the target location, the rotational rate of the LOS may be more sensitive to external disturbances, and sudden deviations in the trajectory may be more likely to trigger an exception. This is a very favorable property, because when the UAV is away from the target location, the UAV may correct its trajectory without having to retreat, whereas when the UAV is close to the target location, it may not have sufficient control authority to recover the landing trajectory and thus a retreat is necessary.

An example favorable trajectory 404 is illustrated alongside an error condition trajectory 406. The numerical labels for each trajectory represent hypothetical instances where the UAV calculates the LOS using sensor measurements. In the trajectory 404, no exception is triggered because the LOS between the UAV 400 and target location 402 is almost stationary throughout the entire maneuver.

In contrast, in trajectory 406 the UAV 400 is perturbed horizontally between points 1 and 2 by an external disturbance. However, this does not trigger an exception, because the LOS rotational speed determined to be small due to the large distance between the UAV 400 and the target location 402. However, when a similar disturbance occurs between 4 and 5, the LOS rotation is larger, and this triggers an exception which forces the UAV 400 to retreat and retry. To be sure, the LOS calculations can be performed at the UAV level, at the target location level, or cooperatively therebetween. This process can be performed between a UAV controller and target location controller, where control and correction messages are provided a controller of the target location to the UAV. The controller of the UAV repositions itself according to the control and correction messages. This repositioning can occur within an operational zone, where an orientation of the UAV and target location occurs to ensure proper alignment, or when the UAV retreats to a higher altitude.

Figure 5:
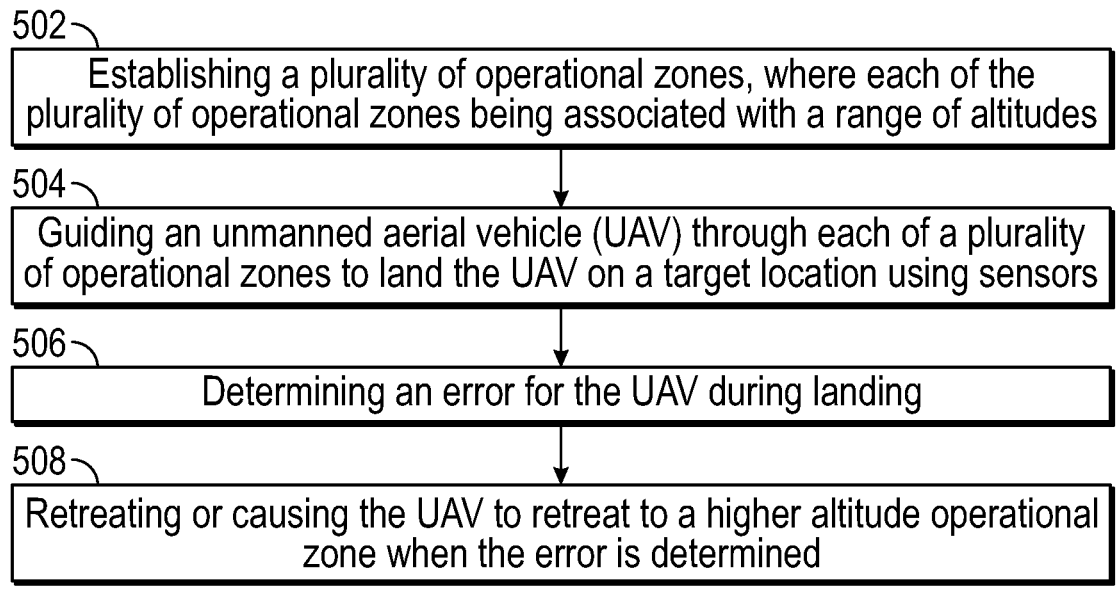
FIGS. 5 and 6 are flowcharts of example methods of the present disclosure.

FIG. 5 illustrates a flowchart of an example method of the present disclosure. The method is generally directed to landing an unmanned aerial vehicle (UAV). The method includes a step 502 of establishing a plurality of operational zones, where each of the plurality of operational zones being associated with a range of altitudes. The operational zones can be established as geo-fences by the UAV or can be received from a target location such as a vehicle with a landing platform. In some embodiments, operational zones can be defined by a cylinder having a height component that corresponds to the range of altitudes and a width component that corresponds to a diameter measured from a central axis of the target location.

Next, the method includes a step 504 of guiding an unmanned aerial vehicle (UAV) through each of a plurality of operational zones to land the UAV on a target location using sensors. To be sure, the sensors are configured to sense a distance between the UAV to the target location or an orientation between the UAV and the target location. In some embodiments, portions of the sensors are configured for use at different altitudes. In various embodiments, the method includes a step 506 of determining an error for the UAV during landing. If an error is detected, the method includes a step 508 retreating or causing the UAV to retreat to a higher altitude operational zone when the error is determined. Again, an error can be determined using proportional navigation logic or using movement thresholds as disclosed above.

Figure 6:
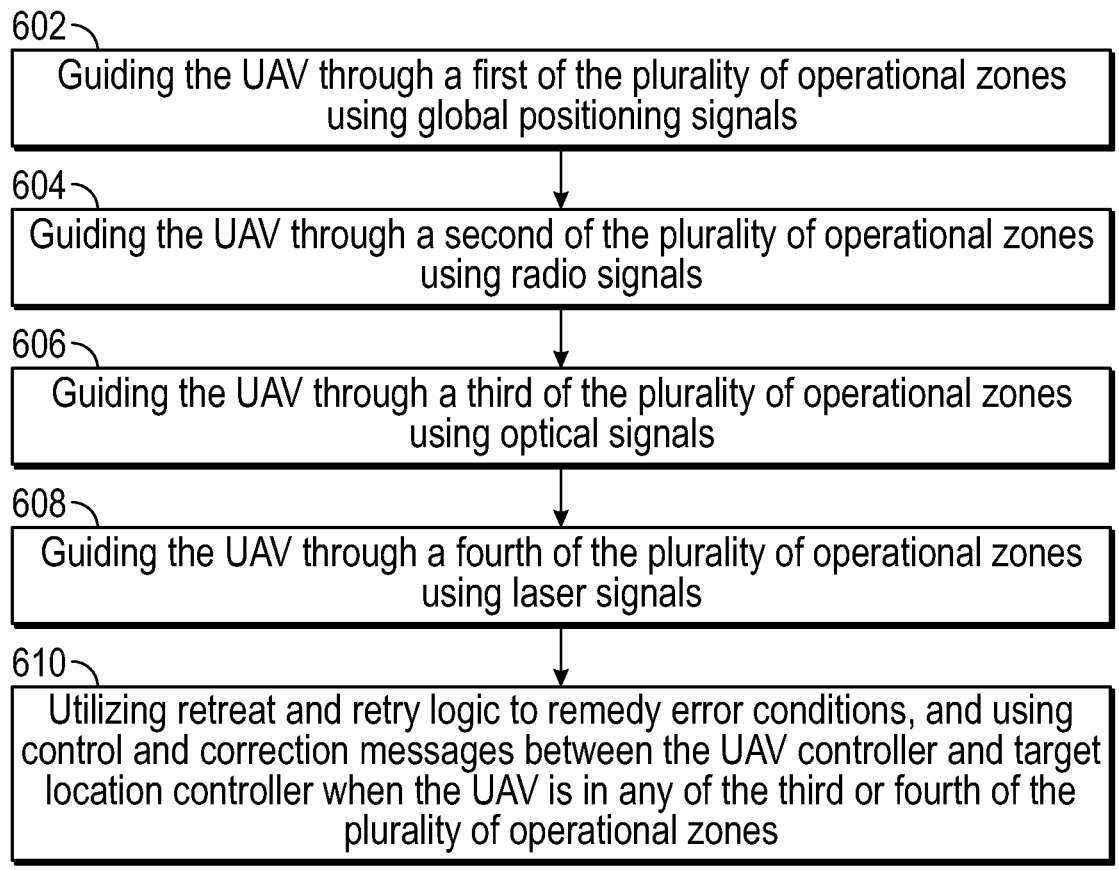

FIG. 6 is a flowchart of a detailed method for guiding the (UAV) into each of a plurality of operational zones to land the UAV on a target location using sensors. The method can include a step 602 of guiding the UAV through a first of the plurality of operational zones using global positioning signals. Next, the method includes a step 604 of guiding the UAV through a second of the plurality of operational zones using radio signals. In some embodiments, the method includes a step 606 of guiding the UAV through a third of the plurality of operational zones using optical signals, as well as a step 608 of guiding the UAV through a fourth of the plurality of operational zones using laser signals.

In some embodiments, the method includes a step 610 of utilizing retreat and retry logic to remedy error conditions, and utilizing control and correction messages between the UAV controller and the target location controller when the UAV is in any of the third or fourth of the plurality of operational zones. In some embodiments, the control and correction messages are used to adjust the orientation of the UAV through a change of at least one of a horizontal or a vertical position of the UAV relative to the target location.

Example Embodiments

In some instances, the following examples may be implemented together or separately by the systems and methods described herein.

Example 1 may include a system, comprising: a target location for receiving an unmanned aerial vehicle (UAV); a plurality of sensors configured to determine a position or orientation of the UAV at different altitudes above the target location; and a processor and memory for storing executable instructions, the processor executing the instructions to: determine which of a plurality of operational zones the UAV is operating within, each of the plurality of operational zones being associated with a range of altitudes, wherein the UAV passes through the plurality of operational zones in a sequential manner to land on the target location; determine when an error has occurred when the UAV is passing through one of the plurality of operational zones; and determine, in response to the error, an instruction to the UAV to retreat from a current operational zone of the plurality of operational zones to an outer operational zone of the plurality of operational zones.

Example 2 may include the system according to example 1 and/or some other example herein, wherein the sensors are each configured to sense a distance between the UAV to the target location, each of the sensors being configured for use at different altitudes.

Example 3 may include the system according to example 1 and/or some other example herein, wherein a first portion of the plurality of sensors are associated with a highest altitude operational zone which includes at least one of global positioning, real time kinematic, dead reckoning, barometer, or combinations thereof, and wherein a second portion of the plurality of sensors are associated with a first intermediate altitude operational zone including at least one of sonar, ultrasound, light detection and ranging, or combinations thereof, the second portion of the plurality of sensors being configured to allow the UAV to avoid static obstacles near the target location.

Example 4 may include the system according to example 3 and/or some other example herein, wherein a third portion of the plurality of sensors are associated with a second intermediate altitude operational zone which includes at least one of a camera, light detection and ranging, or combinations thereof, the third portion of the plurality of sensors being configured to allow the UAV to avoid dynamic obstacles near the target location.

Example 5 may include the system according to example 4 and/or some other example herein, wherein a fourth portion of the plurality of sensors are associated with a lowest altitude operational zone and configured to ensure that the UAV is oriented directly above the target location.

Example 6 may include the system according to example 1 and/or some other example herein, further comprising a landing assistance mechanism comprising one or more magnets disposed on the target location that cooperate with one or more UAV magnets disposed on the UAV.

Example 7 may include the system according to example 1 and/or some other example herein, wherein the target location has a sidewall that is angled or concave to guide the UAV into a center of the target location.

Example 8 may include the system according to example 1 and/or some other example herein, further comprising a landing assistance mechanism comprising at least one of duct fans or air nozzles that direct the UAV into contact with the target location.

Example 9 may include a system, comprising: an unmanned aerial vehicle (UAV) configured to operate in a plurality of operational zones, each of the plurality of operational zones being associated with a range of altitudes, the UAV comprising a plurality of sensors, the UAV comprising a controller, a processor and memory for storing executable instructions, the processor executing the instructions to: cause the UAV to pass through the plurality of operational zones in a sequential manner from a highest altitude operational zone to a lowest altitude operational zone to land on the target location; determine when an error has occurred when the UAV is passing through one of the plurality of operational zones; and cause, in response to the error, the UAV to retreat from a current operational zone of the plurality of operational zones to a higher-altitude operational zone of the plurality of operational zones.

Example 10 may include the system according to example 9 and/or some other example herein, wherein the controller determines that an error has occurred using proportional navigation where the controller determines a line of sight vector between the UAV and the target location, wherein when rotation of the line of sight vector is at or above a threshold the controller causes the UAV to retreat to the higher-altitude one of the plurality of operational zones.

Example 11 may include the system according to example 9 and/or some other example herein, wherein the plurality of sensors comprises a global positioning sensor for a first operational zone of the plurality of operational zones, a radio beacon for a second operational zone of the plurality of operational zones, an optical sensor for a third operational zone of the plurality of operational zones, and a laser sensor for a fourth operational zone of the plurality of operational zones.

Example 12 may include the system according to example 11 and/or some other example herein, wherein the optical sensor comprises a camera that senses a fiducial marker on the target location.

Example 13 may include the system according to example 11 and/or some other example herein, further comprising: receiving control and correction messages from a controller of the target location when the UAV is in the fourth operational zone; and repositioning the UAV according to the control and correction messages.

Example 14 may include the system according to example 9 and/or some other example herein, wherein the controller determines that an error has occurred when the controller determines that horizontal or vertical movement of the UAV within one of the plurality of operational zones has exceeded a threshold.

Example 15 may include a method for landing an unmanned aerial vehicle (UAV), comprising: establishing a plurality of operational zones, each of the plurality of operational zones being associated with a range of distances from a target location; guiding an unmanned aerial vehicle (UAV) through each of the plurality of operational zones to land the UAV on the target location using sensors, wherein the sensors are configured to sense a distance between the UAV to the target location or an orientation between the UAV and the target location, wherein portions of the sensors are configured for use at different altitudes; and determining an error for the UAV during landing, wherein the UAV retreats to an operational zone having a greater distance than a current operational zone when the error is determined.

Example 16 may include the method according to example 15 and/or some other example herein, wherein determining the error includes determining a line of sight vector between the UAV and the target location, wherein when rotation of the line of sight vector is at or above a threshold the UAV retreats to a higher altitude operational zone.

Example 17 may include the method according to example 15 and/or some other example herein, wherein determining the error includes determining that horizontal or vertical movement of the UAV within one of the plurality of operational zones has exceeded a threshold.

Example 18 may include the method according to example 15 and/or some other example herein, wherein the plurality of operational zones are defined by a cylinder having a height component that corresponds to the range of altitudes and a width component that corresponds to a diameter measured from a central axis of the target location.

Example 19 may include the method according to example 15 and/or some other example herein, wherein guiding the (UAV) into each of a plurality of operational zones to land the UAV on a target location using the sensors comprises: guiding the UAV through a first of the plurality of operational zones using global positioning signals; guiding the UAV through a second of the plurality of operational zones using radio signals; guiding the UAV through a third of the plurality of operational zones using optical signals; and guiding the UAV through a fourth of the plurality of operational zones using laser signals.

Example 20 may include the method according to example 19 and/or some other example herein, further comprising utilizing control and correction messages when the UAV is in any of the third or fourth of the plurality of operational zones, the control and correction messages being used to adjust the orientation of the UAV through a change of at least one of a horizontal or a vertical position of the UAV relative to the target location.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   a target location for receiving an unmanned aerial vehicle (UAV);
   a plurality of sensors configured to determine a position or orientation of the UAV at different altitudes above the target location; and
   a processor and memory for storing executable instructions, the processor executing the instructions to:
      determine which of a plurality of operational zones the UAV is operating within, each of the plurality of operational zones being assigned to a range of altitudes, wherein the UAV passes through the plurality of operational zones in a sequential manner to land on the target location;
      determine when an error has occurred when the UAV is passing through one of the plurality of operational zones; and
      determine, in response to the error, an instruction to the UAV to retreat from a current operational zone of the plurality of operational zones to an outer operational zone of the plurality of operational zones,
      wherein the controller determines that an error has occurred using proportional navigation where the controller determines a line of sight vector between the UAV and the target location, and
      wherein when rotation of the line of sight vector is at or above a threshold the controller causes the UAV to retreat to the higher-altitude one of the plurality of operational zones.

2. The system according to claim 1, wherein the sensors are each configured to sense a distance between the UAV to the target location, each of the sensors being configured for use at different altitudes.

3. The system according to claim 1, wherein a first portion of the plurality of sensors are associated with a highest altitude operational zone which includes at least one of global positioning, real time kinematic, dead reckoning, barometer, or combinations thereof, and wherein a second portion of the plurality of sensors are associated with a first intermediate altitude operational zone including at least one of sonar, ultrasound, light detection and ranging, or combinations thereof, the second portion of the plurality of sensors being configured to allow the UAV to avoid static obstacles near the target location.

4. The system according to claim 3, wherein a third portion of the plurality of sensors are associated with a second intermediate altitude operational zone which includes at least one of a camera, light detection and ranging, or combinations thereof, the third portion of the plurality of sensors being configured to allow the UAV to avoid dynamic obstacles near the target location.

5. The system according to claim 4, wherein a fourth portion of the plurality of sensors are associated with a lowest altitude operational zone and configured to ensure that the UAV is oriented directly above the target location.

6. The system according to claim 1, further comprising a landing assistance mechanism comprising one or more magnets disposed on the target location that cooperate with one or more UAV magnets disposed on the UAV.

7. The system according to claim 1, wherein the target location has a sidewall that is angled or concave to guide the UAV into a center of the target location.

8. The system according to claim 1, further comprising a landing assistance mechanism comprising at least one of duct fans or air nozzles that direct the UAV into contact with the target location.

9. A system, comprising:
   an unmanned aerial vehicle (UAV) configured to operate in a plurality of operational zones, each of the plurality of operational zones being associated with a range of altitudes, the UAV comprising a plurality of sensors, the UAV comprising a controller, a processor and memory for storing executable instructions, the processor executing the instructions to:
      cause the UAV to pass through the plurality of operational zones in a sequential manner from a highest altitude operational zone to a lowest altitude operational zone to land on the target location;
      determine when an error has occurred when the UAV is passing through one of the plurality of operational zones; and
      cause, in response to the error, the UAV to retreat from a current operational zone of the plurality of operational zones to a higher-altitude operational zone of the plurality of operational zones,
      wherein the controller determines that an error has occurred using proportional navigation where the controller determines a line of sight vector between the UAV and the target location,
      and wherein when rotation of the line of sight vector is at or above a threshold the controller causes the UAV to retreat to the higher-altitude one of the plurality of operational zones.

10. The system according to claim 9, wherein the plurality of sensors comprises a global positioning sensor for a first operational zone of the plurality of operational zones, a radio beacon for a second operational zone of the plurality of operational zones, an optical sensor for a third operational zone of the plurality of operational zones, and a laser sensor for a fourth operational zone of the plurality of operational zones.

11. The system according to claim 9, wherein the optical sensor comprises a camera that senses a fiducial marker on the target location.

12. The system according to claim 9, further comprising:
   receiving control and correction messages from a controller of the target location when the UAV is in the fourth operational zone; and repositioning the UAV according to the control and correction messages.

13. The system according to claim 9, wherein the controller determines that an error has occurred when the controller determines that horizontal or vertical movement of the UAV within one of the plurality of operational zones has exceeded a threshold.

14. A method for landing an unmanned aerial vehicle (UAV), comprising:
    establishing a plurality of operational zones, each of the plurality of operational zones being associated with a range of distances from a target location;
    guiding an unmanned aerial vehicle (UAV) through each of the plurality of operational zones to land the UAV on the target location using sensors, wherein the sensors are configured to sense a distance between the UAV to the target location or an orientation between the UAV and the target location, wherein portions of the sensors are configured for use at different altitudes; and
    determining an error for the UAV during landing, wherein the UAV retreats to an operational zone having a greater distance than a current operational zone when the error is determined, and wherein determining the error includes determining a line of sight vector between the UAV and the target location, and wherein when rotation of the line of sight vector is at or above a threshold the UAV retreats to a higher altitude operational zone.

15. The method according to claim 14, wherein determining the error includes determining that horizontal or vertical movement of the UAV within one of the plurality of operational zones has exceeded a threshold.

16. The method according to claim 14, wherein the plurality of operational zones are defined by a cylinder having a height component that corresponds to the range of altitudes and a width component that corresponds to a diameter measured from a central axis of the target location.

17. The method according to claim 14, wherein guiding the (UAV) into each of a plurality of operational zones to land the UAV on a target location using the sensors comprises:
    guiding the UAV through a first of the plurality of operational zones using global positioning signals;
    guiding the UAV through a second of the plurality of operational zones using radio signals;
    guiding the UAV through a third of the plurality of operational zones using optical signals; and
    guiding the UAV through a fourth of the plurality of operational zones using laser signals.

18. The method according to claim 14, further comprising utilizing control and correction messages when the UAV is in any of the third or fourth of the plurality of operational zones, the control and correction messages being used to adjust the orientation of the UAV through a change of at least one of a horizontal or a vertical position of the UAV relative to the target location.

* * * * *